US012108873B2

(12) United States Patent
Adams

(10) Patent No.: US 12,108,873 B2
(45) **Date of Patent: *Oct. 8, 2024**

(54) ACTUATING WORK SURFACE FOR STORAGE DEVICE

(71) Applicant: Milwaukee Electric Tool Corporation, Brookfield, WI (US)

(72) Inventor: Caleb C. Adams, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 23 days.

This patent is subject to a terminal disclaimer.

(21) Appl. No.: 18/057,872

(22) Filed: Nov. 22, 2022

(65) Prior Publication Data

US 2023/0079340 A1 Mar. 16, 2023

Related U.S. Application Data

(63) Continuation of application No. 17/130,919, filed on Dec. 22, 2020, now Pat. No. 11,510,486, which is a (Continued)

(51) Int. Cl.
*B25H 3/02* (2006.01)
*A47B 3/10* (2006.01)
(Continued)

(52) U.S. Cl.
CPC .............. *A47B 3/10* (2013.01); *A47B 13/088* (2013.01); *B25H 3/02* (2013.01); *B25H 3/021* (2013.01); *B65D 21/02* (2013.01)

(58) Field of Classification Search
CPC ......... A47B 3/10; A47B 13/088; A47B 17/02; B25H 3/02; B25H 3/021; B25H 3/00;
(Continued)

(56) References Cited

U.S. PATENT DOCUMENTS 3,156,510 A * 11/1964 Hindin ................. A47B 67/005 312/223.5
4,005,898 A 2/1977 Way
(Continued)

FOREIGN PATENT DOCUMENTS

CA 3048682 A1 * 7/2018 ............. A01K 1/035
CN 105690347 6/2016
(Continued)

OTHER PUBLICATIONS

International Search Report and Written Opinion for International Application No. PCT/US2020/064230, mailed Apr. 8, 2021, 9 pages.

*Primary Examiner* — J. Gregory Pickett
*Assistant Examiner* — Abigail Elizabeth Guidry
(74) *Attorney, Agent, or Firm* — Reinhart Boerner Van Deuren s.c.

(57) ABSTRACT

The systems described in this disclosure can be used with a storage system to provide a platform for items and/or papers such as blueprints. A container includes a top panel that is pivotal relative to the container. The container may include additional panels that are pivotal with respect to the top panel and that rotate away from the top panel to extend the platform provided by the top panel.

20 Claims, 10 Drawing Sheets

Related U.S. Application Data continuation of application No. PCT/US2020/064230, filed on Dec. 10, 2020.

(60) Provisional application No. 62/947,923, filed on Dec. 13, 2019.

(51) Int. Cl.
*A47B 13/08* (2006.01)
*B65D 21/02* (2006.01)

(58) Field of Classification Search
CPC . B25H 3/006; B25H 3/04; B25H 3/06; B25H 5/00; B65D 21/02; B65D 21/0204; A45C 13/00; A45C 9/00; B44D 3/02; B44D 3/04
See application file for complete search history.

(56) References Cited

U.S. PATENT DOCUMENTS 4,735,469 A * 4/1988 Liggett .................. A47B 81/06 108/6
5,197,393 A * 3/1993 Yeakle ..................... A47B 9/14 108/147
6,223,479 B1 5/2001 Stockli
7,134,756 B2 * 11/2006 Drucker ................. G03B 21/28 353/77
7,360,813 B2 * 4/2008 Ting ....................... A61G 3/001 296/65.05
10,564,670 B2 * 2/2020 Mos ...................... G06F 1/1628
10,583,962 B2 * 3/2020 Brunner ................. A45C 7/005
10,827,827 B1 * 11/2020 Failing ................... A47B 21/03
10,962,218 B2 * 3/2021 Plato ..................... H02J 7/0045
11,304,510 B1 4/2022 Fernandes
11,338,959 B2 5/2022 Hoppe et al.
11,510,486 B2 * 11/2022 Adams ................. A47B 23/044
2002/0112977 A1 8/2002 Barber
2003/0070948 A1 4/2003 Barber et al.
2003/0085552 A1 5/2003 Shapiro
2004/0165060 A1 8/2004 McNelley et al.
2005/0099102 A1 * 5/2005 Villarreal ............... A47B 21/00 312/237
2006/0131192 A1 * 6/2006 Hernandez ............ A45C 13/02 206/349
2008/0041279 A1 * 2/2008 Johnson ................ A47B 31/04 108/35
2015/0273682 A9 * 10/2015 Manalang ............. A47B 88/40 312/294
2016/0144500 A1 * 5/2016 Chen .................... B65D 21/023 206/349
2017/0166352 A1 6/2017 Hoppe et al.
2018/0178703 A1 6/2018 Keck
2018/0264876 A1 9/2018 Davis
2019/0225371 A1 7/2019 Hoppe et al.
2020/0147781 A1 3/2020 Squiers et al.
2020/0165036 A1 5/2020 Squiers et al.
2023/0079340 A1 * 3/2023 Adams ..................... A47B 3/10 206/349
2023/0085857 A1 * 3/2023 Porter .................... A45C 15/00 5/413 R
2023/0293979 A1 * 9/2023 Che ........................ A47B 19/08 108/59
2023/0301429 A1 * 9/2023 Braun ....................... A47F 5/08
2023/0329409 A1 * 10/2023 Stearns .................... B25H 3/02

FOREIGN PATENT DOCUMENTS

EP 2805799 11/2014
EP 2805799 A2 * 11/2014 ............... B25H 3/02
EP 3476240 5/2019
EP 3974118 A2 * 3/2022 ............. B25H 3/003
WO WO2017/149539 9/2017
WO WO2021/062172 4/2021
WO WO-2021062172 A1 * 4/2021 ............... B25H 3/02
WO WO-2021119266 A1 * 6/2021 ............. A45C 11/24

* cited by examiner

ACTUATING WORK SURFACE FOR STORAGE DEVICE

CROSS-REFERENCE TO RELATED PATENT APPLICATION

The present application is a continuation of U.S. application Ser. No. 17/130,919, filed Dec. 22, 2020, which is a continuation of International Application No. PCT/US2020/064230, filed Dec. 10, 2020, which claims the benefit of and priority to U.S. Provisional Application No. 62/947,923, filed on Dec. 13, 2019, which are incorporated herein by reference in their entireties.

BACKGROUND OF THE INVENTION

The present disclosure is directed generally to the field of tool storage systems and related devices. The present disclosure relates specifically to a device or tool storage container that includes a surface, such as a writing surface, and a coupling mechanism to detachably couple the device or tool storage container to another such device or container, such as in a modular tool storage system.

Tool storage units are often used to transport tools and tool accessories. Some storage units are designed to incorporate into a modular storage system. Within a modular storage system, different units, devices and/or containers may provide varying functions, such as being adapted to provide a writing surface.

SUMMARY OF THE INVENTION

A first embodiment of the disclosure relates to a container, such as a tool storage device, including a housing, a top panel defining a top surface, a left panel pivotal relative to the top panel, a support arm, a support structure, and a bottom surface of the container. The left panel pivotally rotates with respect to the top panel around a first axis between an opened position and a closed position. The bottom of the left panel and the top surface of the top panel are both facing upwards when the left panel is in the opened position. A first end of the support arm is pivotal relative to a top of the left panel that is opposite the bottom of the left panel. The support structure includes a ramp that interfaces against a second end of the support arm opposite the first end. When the left panel is in the opened position the ramp defines an angle with respect to a line that extends from the bottom of the ramp to the first axis of the left panel, and the angle is between 65 and 85 degrees. The bottom surface of the container defines a coupling interface configured to couple the container to a second container.

Another embodiment of the disclosure relates to a container that includes a housing, a top panel that defines a top surface, a left panel pivotal relative to the top panel, a support arm, a biasing element, and a bottom surface of the container. The left panel pivotally rotates with respect to the top panel around a first axis between an opened position and a closed position. A bottom of the left panel and the top surface of the top panel are both facing upwards when the left panel is in the opened position. A top of the left panel defines a channel. A first end of the support arm is pivotally coupled to a top of the left panel that is opposite the bottom. The support arm rotates with respect to the left panel around a second axis. The second axis extends through the channel in the left panel. The biasing element biases the support arm into the channel when the left panel is in the opened position.

The bottom surface of the container defines a coupling interface configured to couple the container to a second container.

Another embodiment of the disclosure relates to a container including a housing defining an internal storage compartment, a top panel pivotal relative to the housing, a left panel pivotal relative to the top panel, and a right panel pivotal relative to the top panel. The top panel rotates with respect to the housing around a first axis. The left panel pivotally rotates with respect to the top panel around a second axis, and the second axis is perpendicular to the first axis. The right panel pivotally rotates with respect to the top panel around a third axis, and the third axis is perpendicular to the first axis and parallel to the second axis. The bottom surface of the container defines a coupling interface configured to couple the container to a second container.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION

Referring generally to the figures, an embodiment of a stackable tool storage device, container or unit is shown. One or more of the devices are configured to selectively couple and decouple with storage units. The tool storage device includes one or more panels adjustable to expose one or more surfaces. At constructions sites there can be few surfaces and/or platforms to support object, documents, etc. Described herein is a portable and stackable tool storage system that includes a storage device that provides one or more surfaces, such as writing surfaces. In one embodiment the storage unit has left and/or right panels that butterfly open to expose a unified writing surface, and the left and right panels are pivotally connected to the housing so the writing surface can be angled towards the reader.

Figure 1:
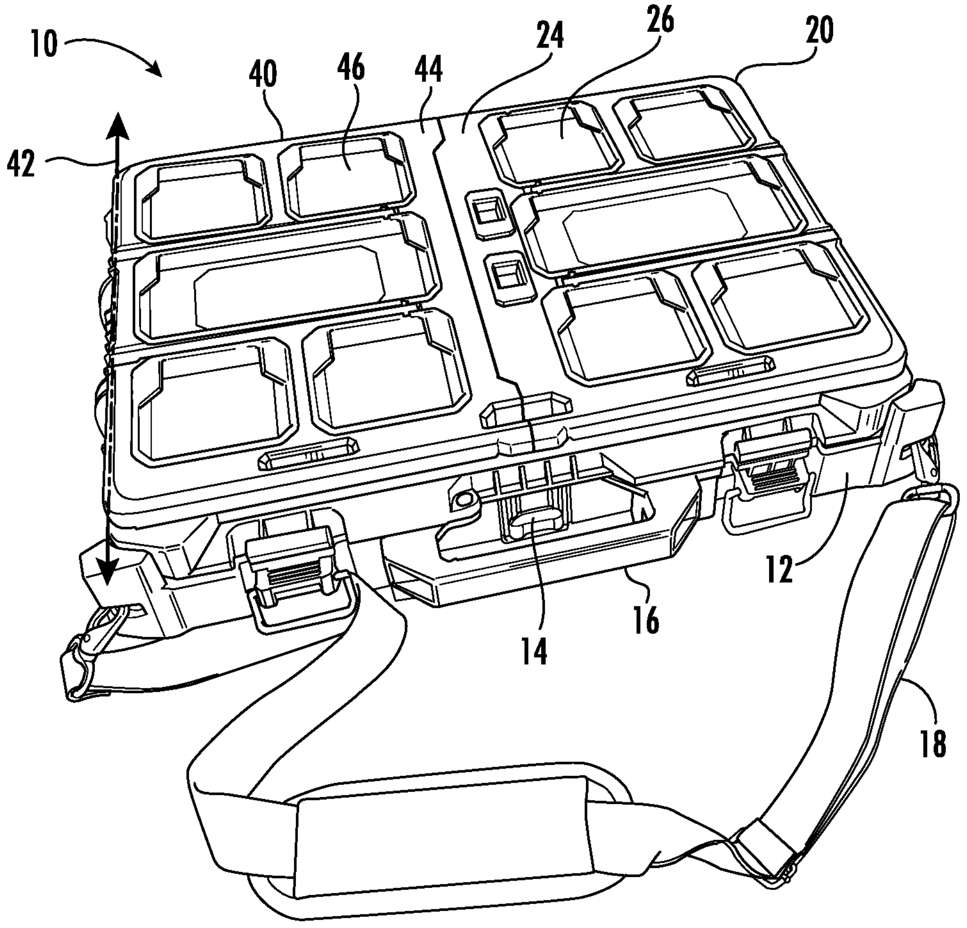
FIG. 1 is a perspective view of a tool storage device, according to an exemplary embodiment.
Figure 2:
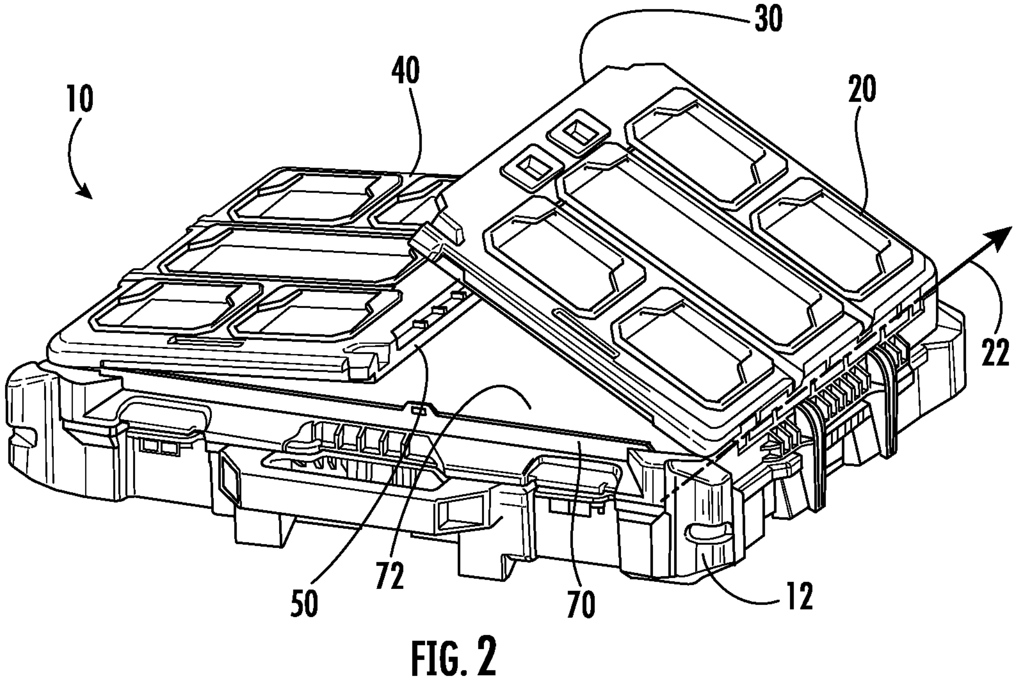
FIG. 2 is a perspective view of the tool storage device of FIG. 1, according to an exemplary embodiment.
Figure 3:
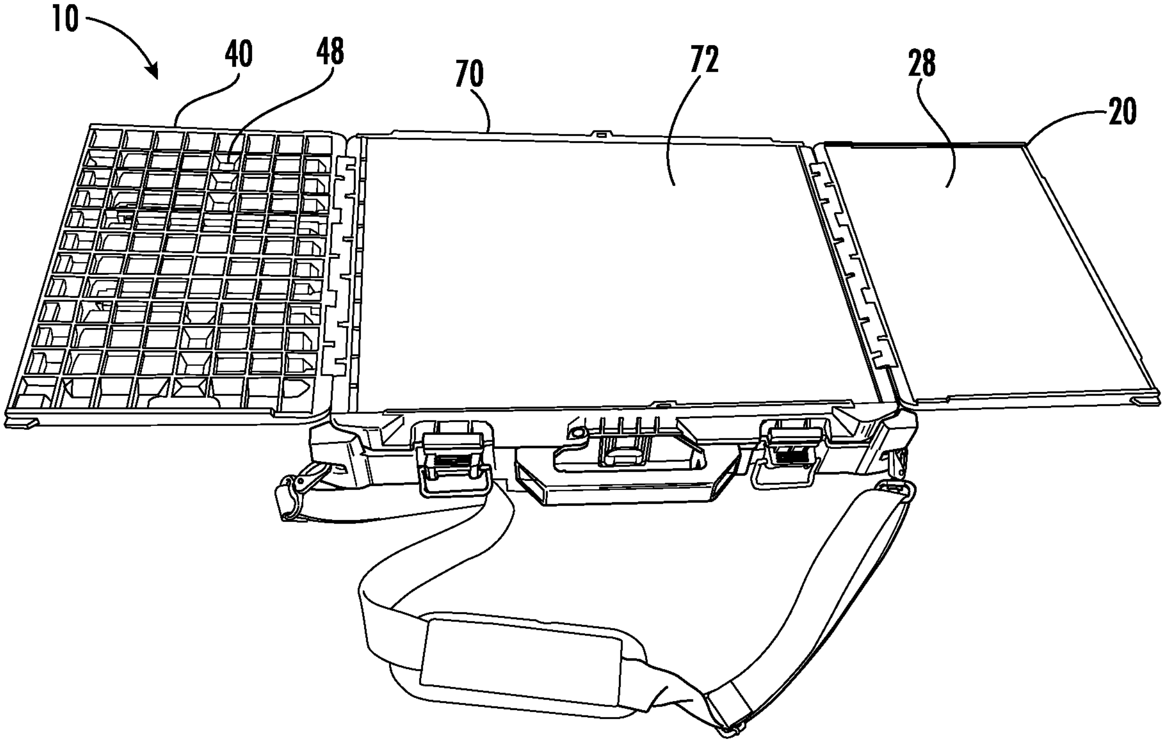
FIG. 3 is a perspective view of the tool storage device of FIG. 1, according to an exemplary embodiment.

Referring to FIGS. 1-3, a modular storage unit, container and/or device, such as tool storage device 10, is shown according to an exemplary embodiment. Tool storage device 10 includes left panel 20 and right panel 40, which pivotally open to expose writing surface 72 of top panel 70. Tool storage device 10 includes a handle 16 and strap 18 for transportation.

Lock 14 and coupling interfaces 26 and 46 are configured to couple tool storage device 10 with other devices, such as other tool storage devices, with similar coupling mechanisms. In a specific embodiment, coupling interfaces 26 and 46 utilize one or more of the coupling structure(s) described in International Patent Application No. PCT/US2018/044629, which is incorporated herein by reference in its entirety.

Left panel 20 rotates with respect to top panel 70 around axis 22, and right panel 40 rotates with respect to top panel 70 around axis 42. When left panel 20 and right panel 40 are in the closed position, lip 30 of left panel 20 extends over lip 50 of right panel 40. As a result, lip 30 of left panel 20 prevents right panel 40 from rotating open until left panel 20 is first rotated from the closed position. When left panel 20 and right panel 40 are rotated opened from the closed position, left panel 20 is rotated until lip 30 no longer interferes with lip 50 of right panel 40.

Left panel 20 includes top surface 24, which includes coupling interface 26. Bottom of left panel 20 defines a surface, shown as writing surface 28. In a specific embodiment, when left panel 20 is in the opened position then bottom surface 28 is coplanar with writing surface 72. Similar to left panel 20, right panel 40 includes top surface 44, which includes coupling interface 46. Bottom of right panel 40 defines surface 48. In a specific embodiment, when right panel 40 is in the opened position then bottom surface 48 is coplanar with writing surface 72.

As shown, surface 28 of left panel 20 provides a planar surface that permits writing on paper, whereas surface 48 of right panel 40 provides a more uneven surface that will support objects but will not easily permit writing on paper. In another specific embodiment both surface 28 and surface 48 are planar and permit writing on paper resting on surface 28 and/or surface 48.

Figure 4:
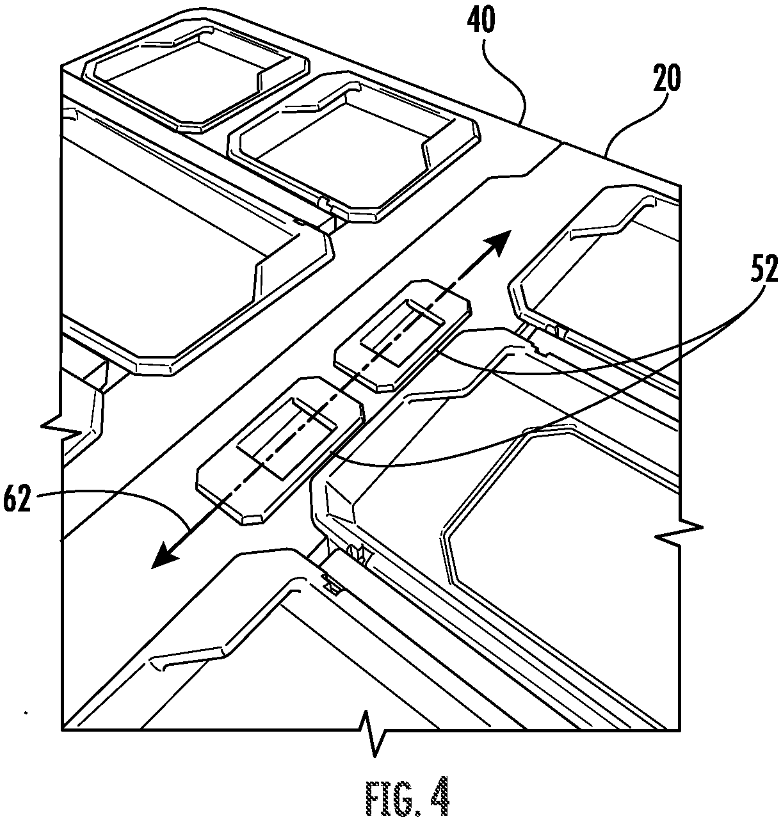
FIG. 4 is a detailed perspective view of the tool storage device of FIG. 1, according to an exemplary embodiment.
Figure 5:
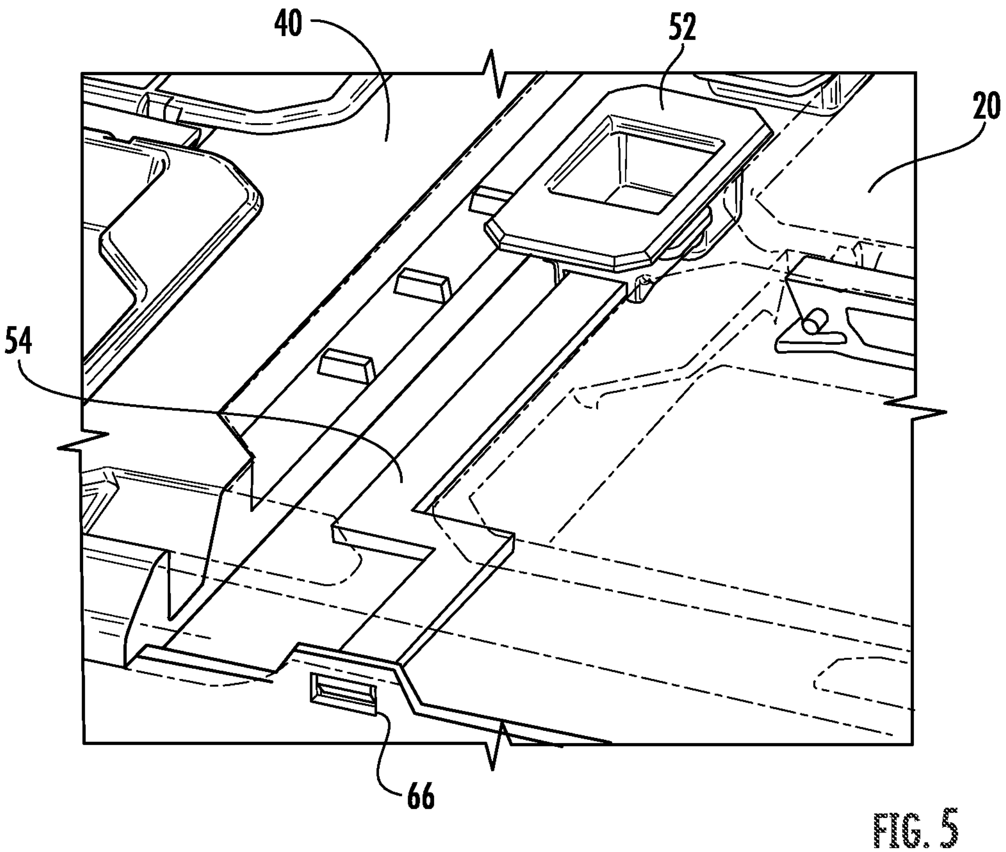
FIG. 5 is a detailed holographic perspective view of the tool storage device of FIG. 1, according to an exemplary embodiment.
Figure 6:
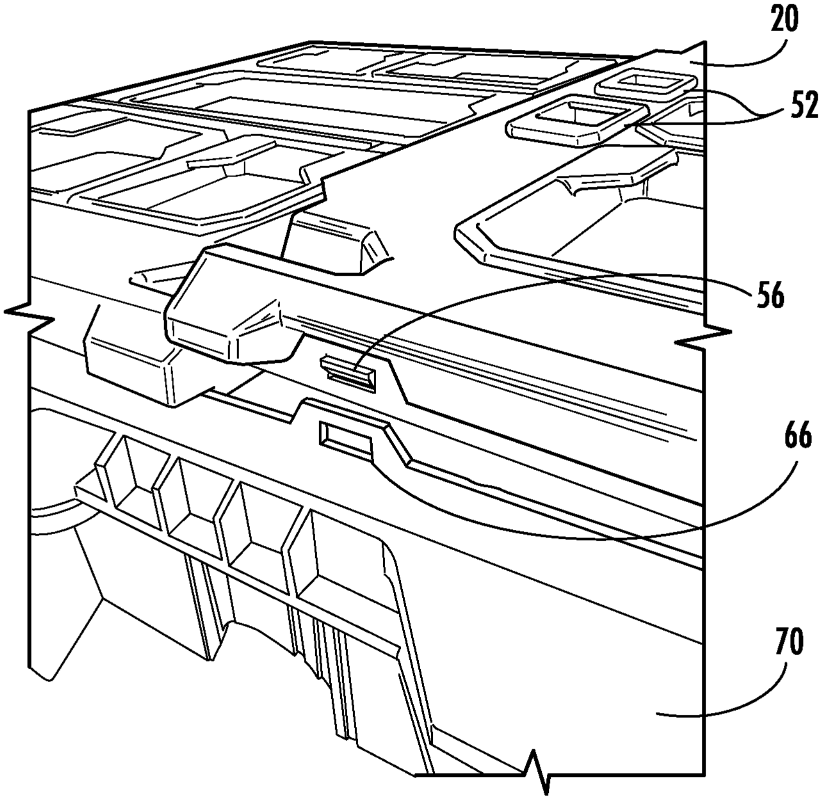
FIG. 6 is a detailed perspective view of the tool storage device of FIG. 1, according to an exemplary embodiment.
Figure 7:
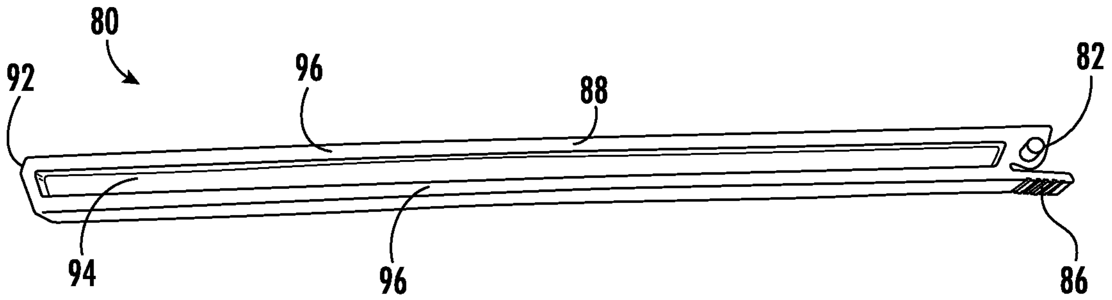
FIG. 7 is a perspective view of a support bar in FIG. 1, according to an exemplary embodiment.
Figure 8:
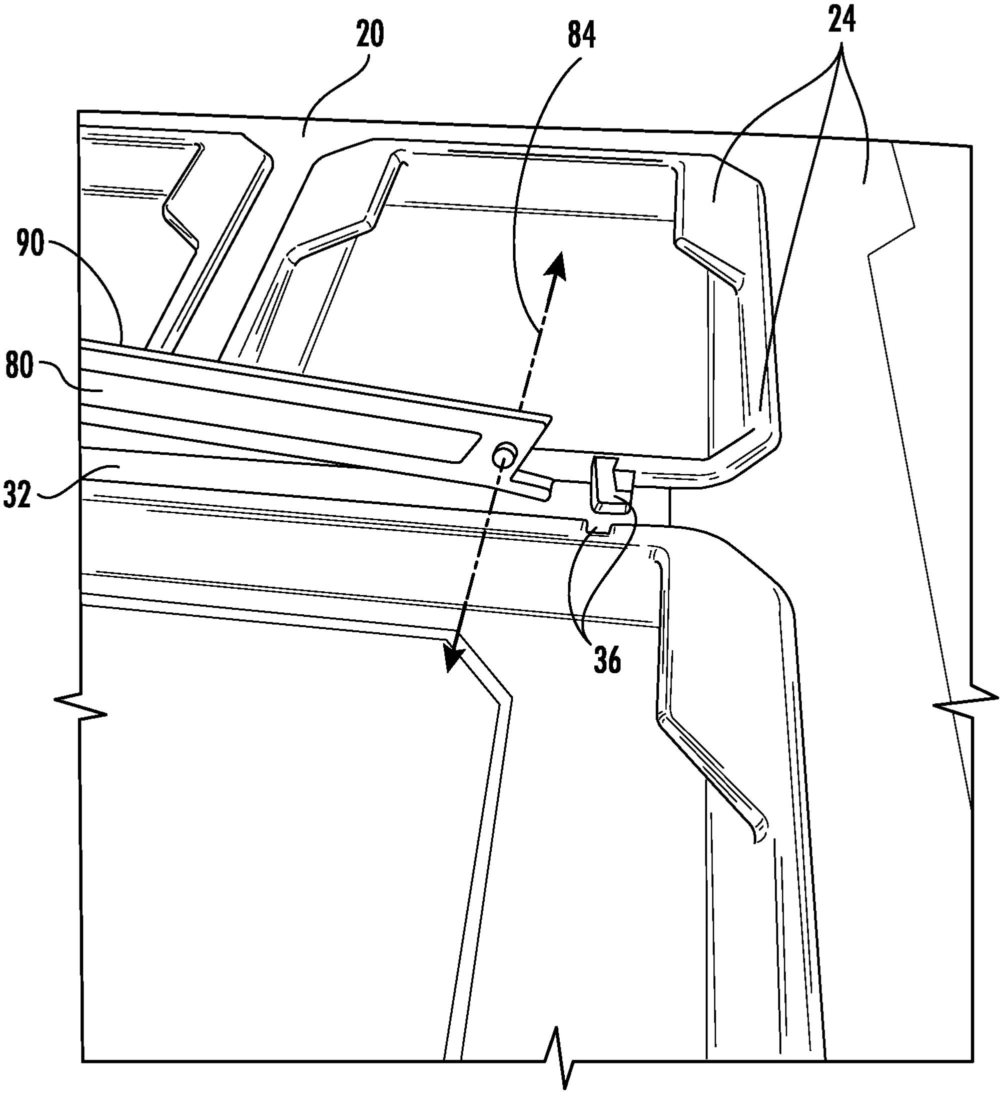
FIG. 8 is a perspective view of the tool storage device of FIG. 1, according to an exemplary embodiment.

Turning to FIGS. 4-6, described therein are various aspects of a locking mechanism for tool storage device 10. A user interacts with locking interfaces 52 to actuate locking interfaces 52 along axis 62. Locking interfaces 52 are coupled to locking arm 54. Protrusion 56 extends from left panel 20 and is coupled to an end of locking arm 54. When left panel 20 is in the closed position, protrusion 56 extends through and interfaces with the interior of aperture 66, thus interfering with left panel 20 being rotated open.

In a specific embodiment, locking interfaces 52 are biased away from each other by a biasing element, such as a spring. To open left panel 20, a user actuates locking interface 52 along axis 62 against the biasing element until protrusion 56 is retracted from aperture 66. Left panel 20 is then rotated around axis 22 until lip 30 of left panel 20 does not interfere with right panel 40 being pivotally opened.

Turning to FIGS. 7-14, various aspects of support elements for left panel 20 and right panel 40 are shown. In one embodiment, support arm 80 includes pins 82 that protrude laterally in opposing directions from support arm 80. To couple support arm to left panel 20, pin 82 is inserted within recess 36 and support arm 80 rotates around axis 84.

Sidewalls 96 define a periphery of support arm 80. Within sidewalls 96 is a cavity, shown as recess 94. Spring 86 extends from body 88 of support arm 80 when support arm 80 is within channel 32. Spring 86 biases support arm 80 towards being restrained within channel 32. In various configurations of left panel 20, top surface 90 of support arm 80 is flush and/or recessed below top surface 24 of left panel 20. As left panel 20 is rotated open until surface 28 is facing upward, spring 86 exerts a biasing force towards keeping support arm 80 within channel 32.

Figure 9:
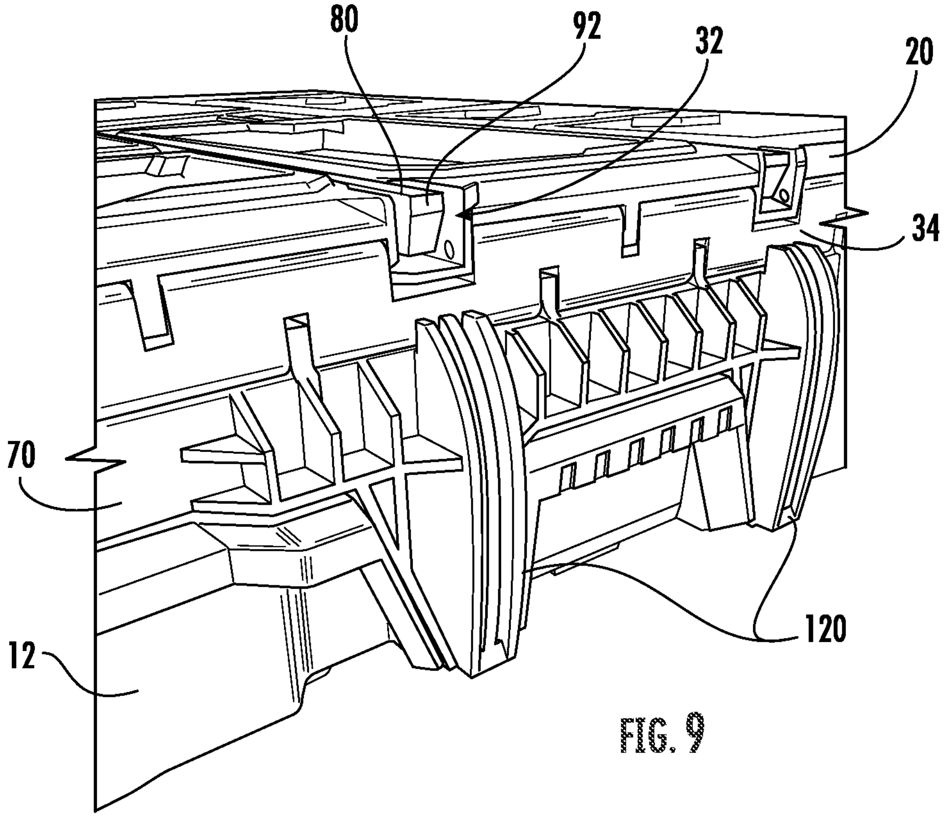
FIG. 9 is a perspective view of the tool storage device of FIG. 1, according to an exemplary embodiment.
Figure 10:
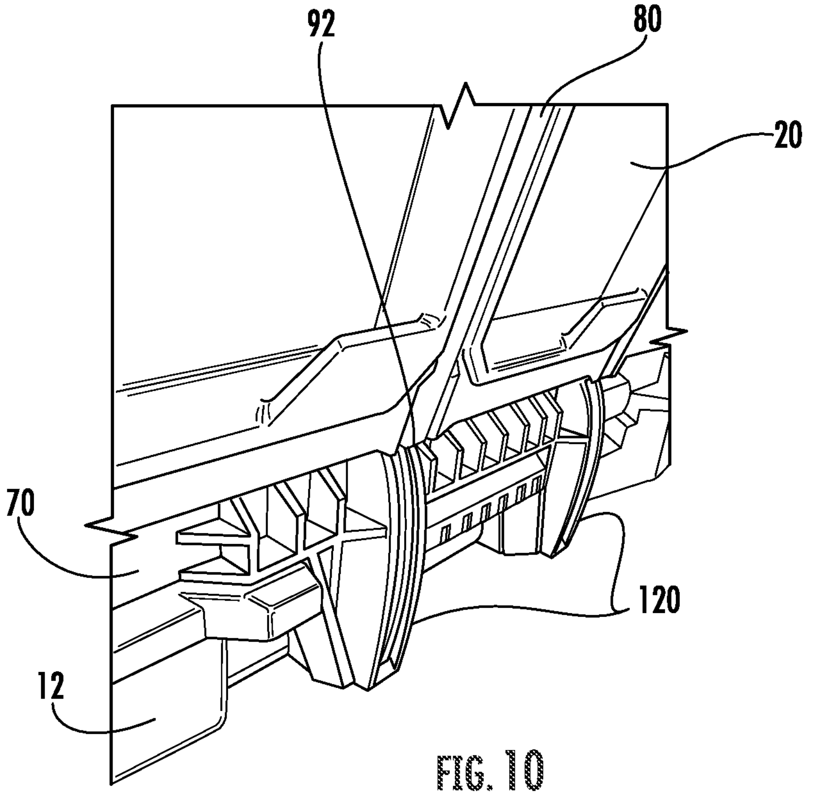
FIG. 10 is a perspective view of the tool storage device of FIG. 1 as the left panel is being opened, according to an exemplary embodiment.

Turning to FIGS. 9-12 in particular, various configurations of left panel 20 and support arm 80 are shown. In FIG. 9, left panel 20 is in the fully closed position. In a specific embodiment end 92 of support arm 80 does not extend past side surface 34 of left panel 20.

Figure 11:
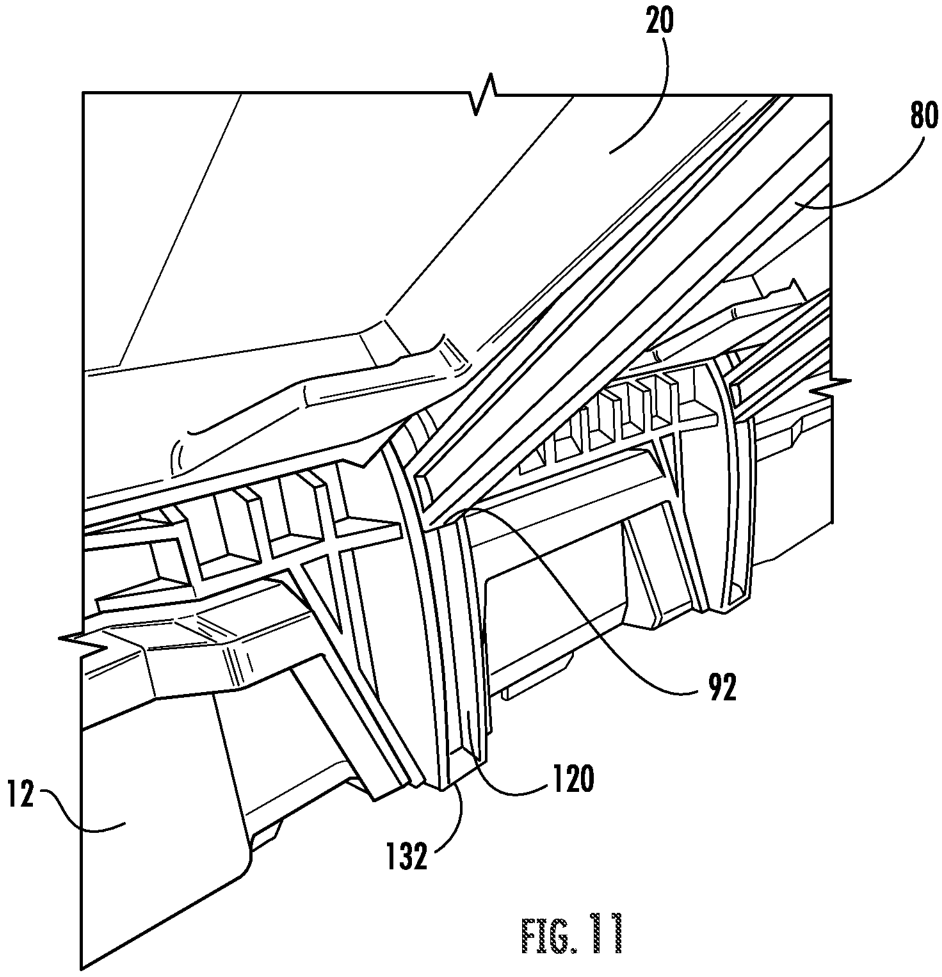
FIG. 11 is a perspective view of the tool storage device of FIG. 1 as the left panel is opened further than in FIG. 10, according to an exemplary embodiment.
Figure 12:
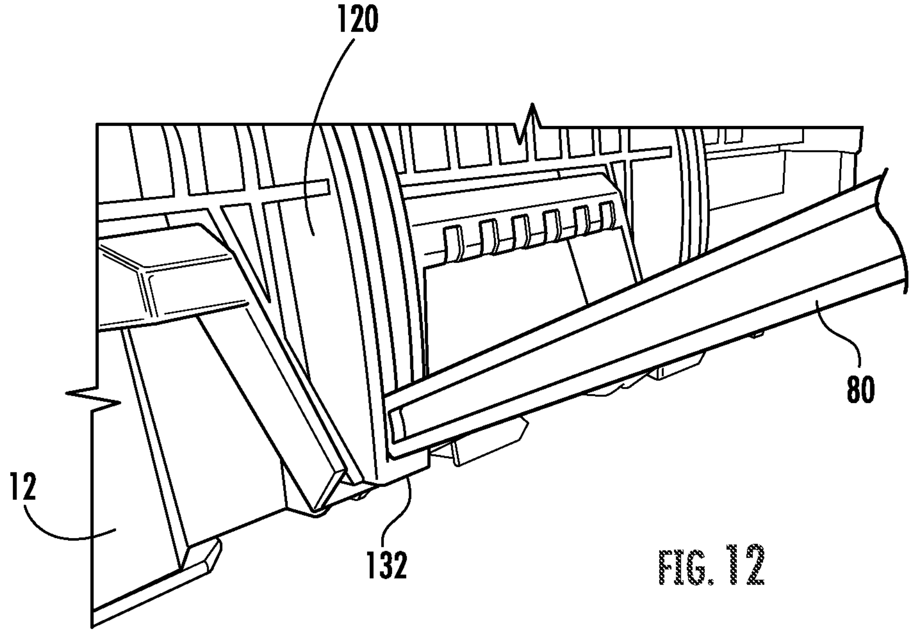
FIG. 12 is a perspective view of the tool storage device of FIG. 1 with the left panel in the opened position, according to an exemplary embodiment.

Support structures 120 are coupled to a side of top panel 70. Left panel 20 is pivotally rotated open (FIG. 10) until support structure 120 is disposed within channel 32, at which point end 92 of support arm 80 interfaces against support structure 120 (FIG. 11). Left panel 20 is further pivotally opened until left panel 20 is in the opened position (FIG. 12). In the opened position of left panel 20, surface 28 of left panel 20 is co-planar and/or nearly co-planar with surface 72 of top panel 70, and end 92 of support arm 80 interfaces against ramp 130.

Figure 13:
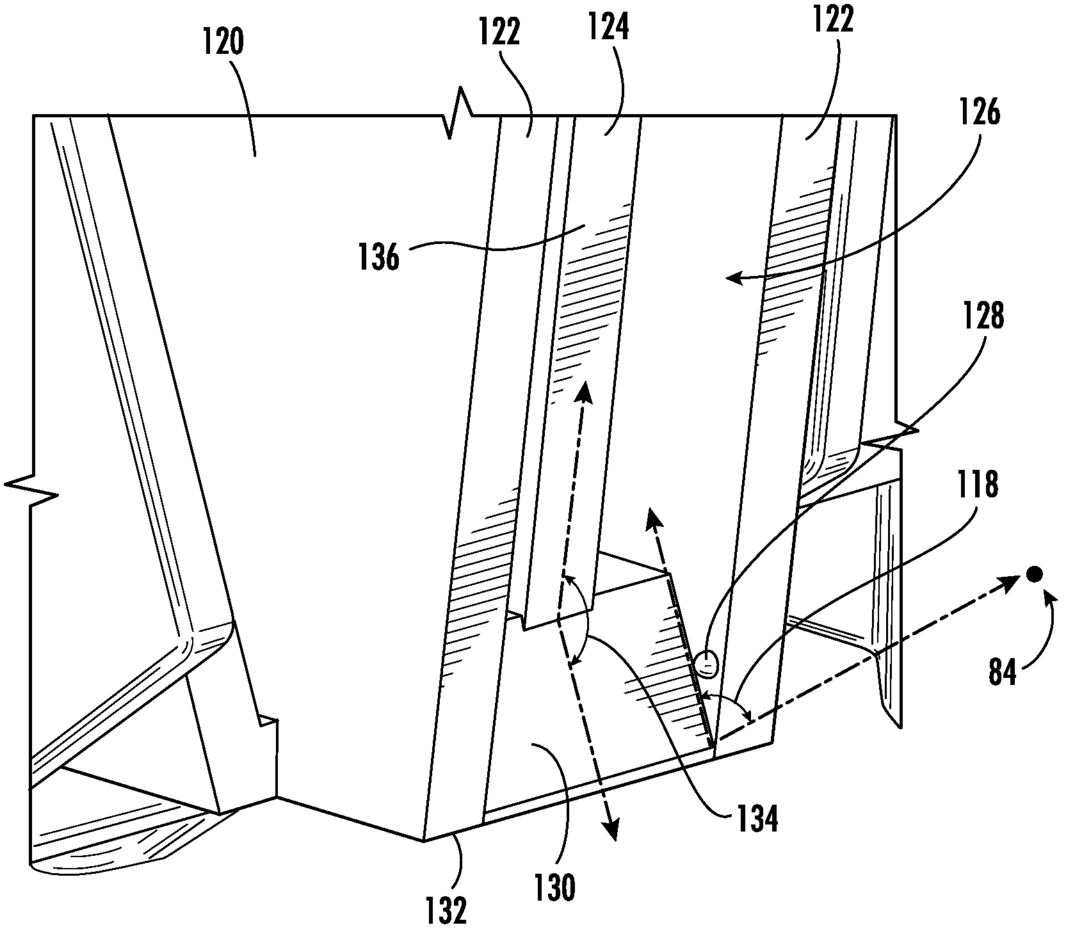
FIG. 13 is a perspective view of a support structure of FIG. 1, according to an exemplary embodiment.
Figure 14:
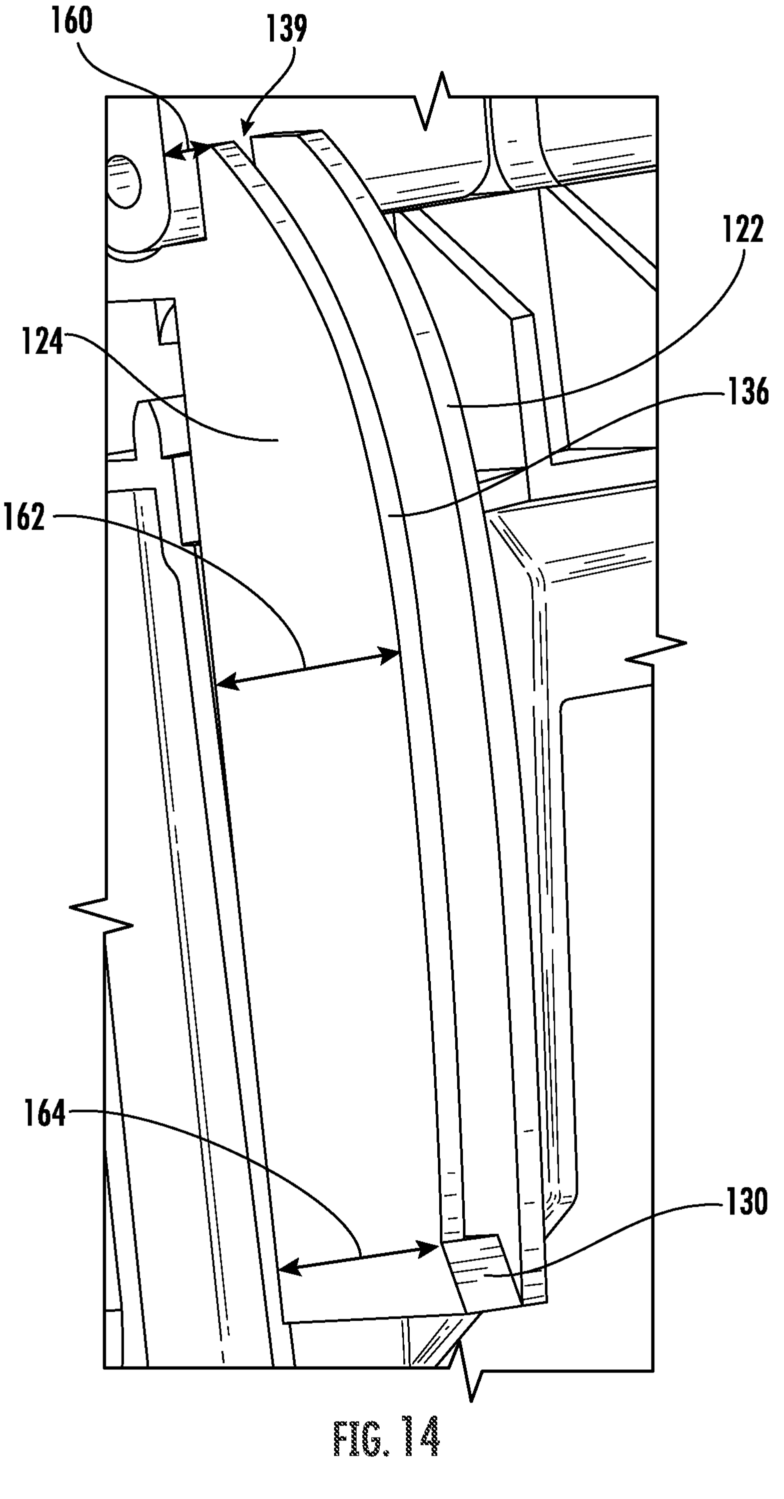
FIG. 14 is a perspective view of a cross-section of the support structure of FIG. 13, according to an exemplary embodiment.

Turning to FIGS. 13 and 14, support structure 120 includes sidewalls 122 and center wall 124. In a specific embodiment sidewalls 122 and center wall 124 extend along the primary longitudinal axis of support structure 120. Sidewalls 122 define a recess 126 that end 92 of support arm 80 slides within as left panel 20 is pivoted to the opened position. As support arm 80 slides from top 139 to bottom 132 of support structure 120, end 92 of support arm 80 interfaces against center wall 124 of support structure until end 92 interfaces against ramp 130.

At the bottom 132 of support structure 120, protrusion 128 extends inwardly from sidewall 122 towards the opposing sidewall 122. When end 92 of support arm 80 interfaces against ramp 130, protrusion 128 extends within recess 94 of support arm 80. As a result, the interface between protrusion 128 and sidewalls 122 bias support arm 80 towards staying in the same position. Thus, the interface between protrusion

128 and support arm 80 provides a biasing force to interfere with support arm 80 pivoting out of support structure 120. In various embodiments protrusion 128 extends from one or more of sidewalls 122, and in a specific embodiment protrusion 128 extends from both sidewalls 122 towards the opposing sidewall 122.

The angle of ramp 130 further biases support arm 80 to stay within support structure 120 when left panel 20 is opened. Ramp 130 defines angle 134 between ramp 130 and top surface 136 of center wall 124. In a specific embodiment, angle 134 is between 130 degrees and 170 degrees, and more particularly between 150 degrees and 160 degrees, and more particularly between 152 degrees and 157 degrees, and more particularly is 154 degrees.

Ramp 130 also defines angle 118 between ramp 130 and line 138 that extends from bottom 132 of ramp 130 towards axis 84 of support arm 80. Thus, when end 92 interfaces against ramp 130 like shown in FIG. 12, the primary longitudinal axis of support arm 80 and ramp 130 define angle 118. In a specific embodiment, angle 118 is between 95 degrees and 115 degrees, and more particularly between 98 degrees and 105 degrees, and more particularly is 100 degrees. As an increasing amount of force is exerted on support arm 80 the entire channel bends until angle 118 becomes less than 90 degrees, allowing support arm 80 to break away, thus helping protect support arm 80 from breaking. Applicant has observed that this angle permits support arm 80 to slide out of support structure 120 when enough force is applied to left panel 20, which protects support arm 80 from breaking when more force is applied to left panel 20 than support arm 80 can absorb without damage.

In a specific embodiment each of left panel 20 and right panel 40 includes two support arms 80 that extend from the respective panel and interface with a support structure 120. For each panel, the respective support arms are arranged approximately one-third and two-thirds of the distance from the top of the panel to the bottom of the panel, thus providing evenly spaced support for the respective panel.

Turning to FIG. 14, in a specific embodiment top surface 136 of center wall 124 is arcuate shaped. Center wall 124 has width 160 at top 139. Moving from top 139, center wall 124 widens to a maximum width of width 162, and then narrows to width 164 at the interface between center wall 124 and ramp 130, which is also the minimum width of center wall 124 beneath width 162. Each of width 160, width 162, and width 164 are measured from side surface 34 of left panel 20 when left panel 20 is in the closed position. In a specific embodiment the ratio between width 160 and width 162 is between 1:6 and 1:2, and more specifically between 1:4 and 1:2.75, and more specifically is 1:3.1. In a specific embodiment the ratio between width 162 and width 164 is between 1:1 and 3:1, and more specifically between 7:5 and 2:1, and more specifically is 8:5.

Figure 15:
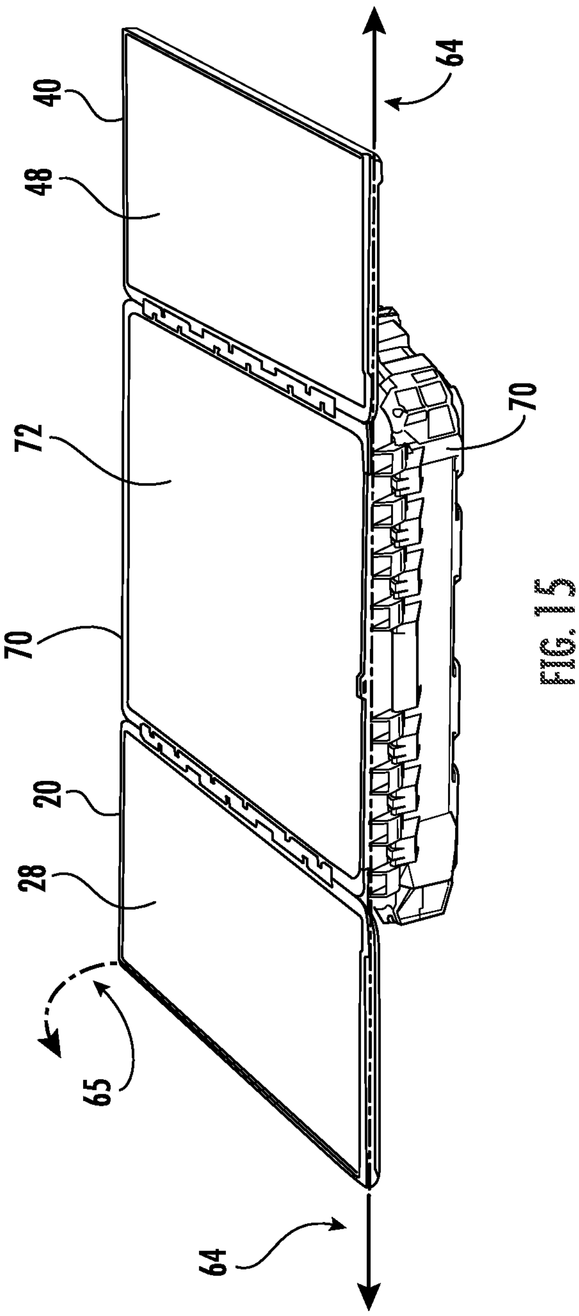
FIG. 15 is a perspective view of the tool storage device of FIG. 1, according to an exemplary embodiment.
Figure 16:
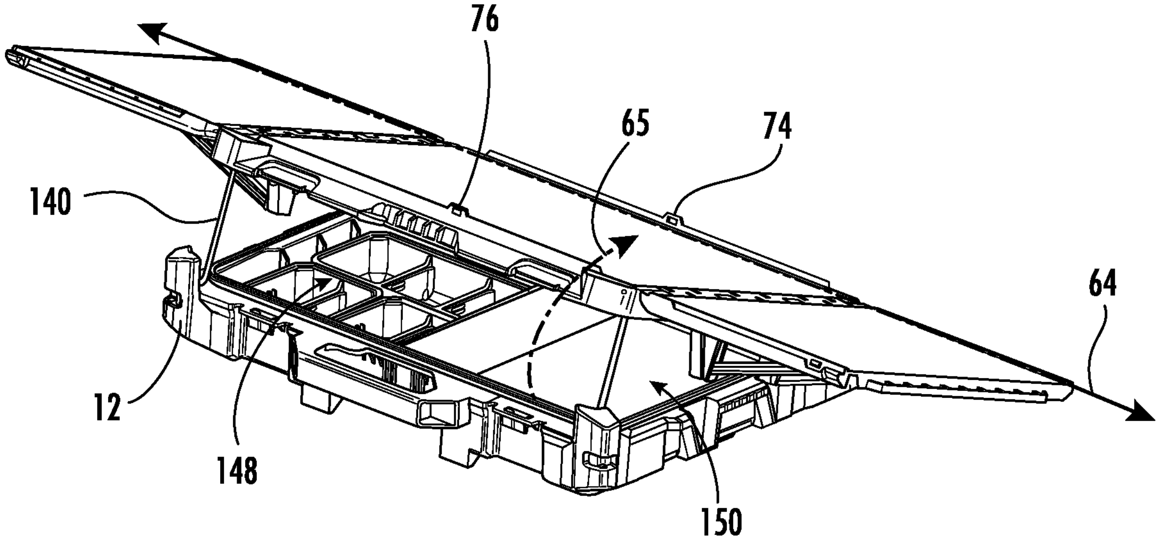
FIG. 16 is a perspective view of a tool storage device, according to an exemplary embodiment.
Figure 17:
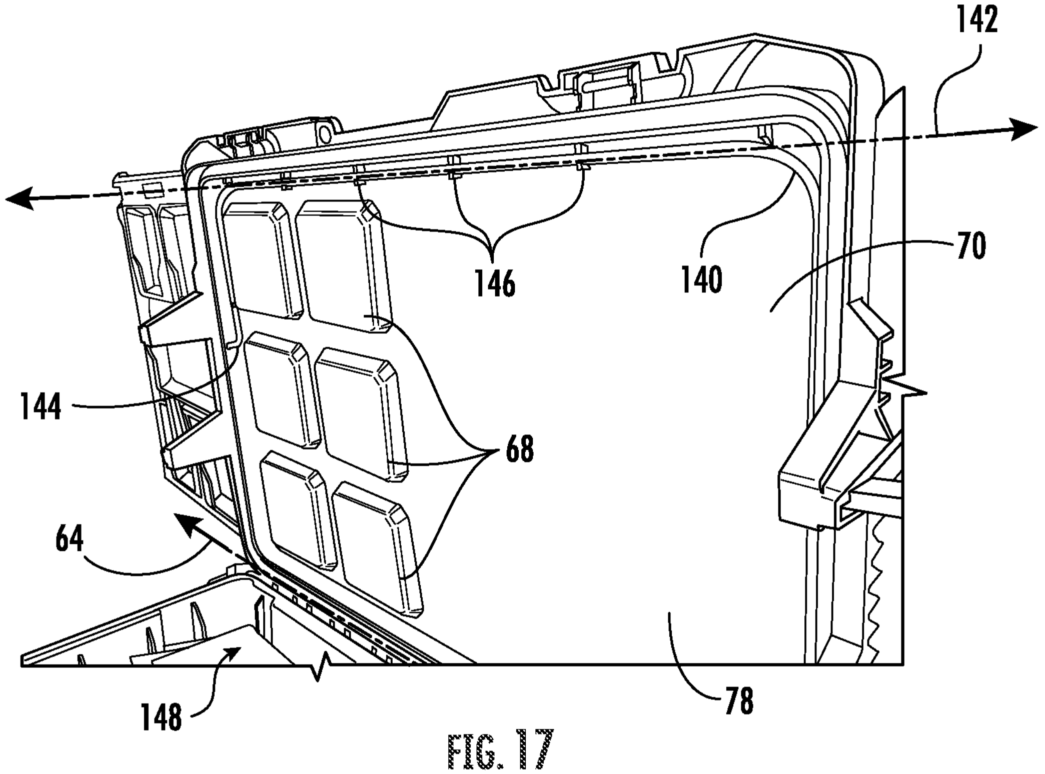
FIG. 17 is a perspective view of a tool storage device, according to an exemplary embodiment.

Turning to FIGS. 15-17, when in the opened position left panel 20 and right panel 40 extend laterally away from top panel 70. In a specific embodiment, when opened each of surfaces 24, 44 and 72, of left panel 20, right panel 40, and top panel 70, respectively, are co-planar and/or nearly coplanar with each other. In the embodiments shown in FIGS. 15-17, a lower wall, which defines surface 48, has been coupled to bottom of right panel 40 so that when right panel 40 is opened right panel 40 also includes a planar surface that supports writing on paper.

Top panel 70 is pivotally coupled to housing 12 and rotates with respect to housing 12 around axis 64 to provide an angled surface that can be used for writing and/or to support papers (e.g., blueprints). In a specific embodiment left panel 20 and right panel 40 are pivotally coupled to top panel 70, and as a result left panel 20 and right panel 40 also pivotally rotate around axis 64 with respect to housing 12.

After top panel 70 is rotated away from housing 12, leg stand 140 can be pivotally rotated to engage with housing 12. Leg stand 140 provides support for top panel 70 to remain at an angle with respect to housing 12 (e.g., 15 degrees). Leg stand 140 is pivotally coupled to a bottom of top panel 70. Bottom surface 78 of top panel 70 includes one or more securing mechanisms, shown as detents 146, that extend from bottom surface 78 of top panel 70. Detents 146 secure leg stand 140 against bottom surface 78.

When top panel 70 is pivoted open as shown in FIG. 16, bottom paper stop 74 interferes with objects and papers sliding off surface 72. Similarly, top paper stop 76 helps secure objects and papers from sliding off the opposing side of top panel 70.

Leg stand 140 can be used to secure the partially-open position of top panel 70 by rotating leg stand 140 around axis 142. Leg stand 140 includes one or more protrusions 144. When leg stand 140 is rotated to the opened position, protrusions 144 interface against housing 12 to secure top panel 70 in the angled position shown in FIG. 16. In a specific embodiment top panel 70 is angled with respect to housing at an angle between 5 degrees to 30 degrees, and more particularly between 10 degrees and 20 degrees, and more particularly at an angle of 15 degrees.

Top panel 70 being opened exposes first compartment 148 and second compartment 150. In a specific embodiment and as shown, first compartment 148 includes a plurality of storage sub-compartments, and second compartment 150 is a unified storage compartment. When top panel 70 is rotated to the closed position, protrusions 68 are positioned above and enclose the plurality of sub-compartments in first compartment 148.

In a specific embodiment tool storage device 10 is designed to stand-alone and does not include a coupling interface to couple tool storage device 10 to other storage devices.

In an alternate embodiment, housing 12 does not include internal compartments for storage. Top panel 70, left panel 20, and right panel 40 pivot relative to housing 12 to provide a tilt to surfaces 28, 48, and 72.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A container comprising:

a housing;

a top panel defining a top surface;

a left panel pivotal relative to the top panel, wherein the left panel pivotally rotates with respect to the top panel around a first axis between an opened position and a closed position, and wherein a bottom of the left panel and the top surface of the top panel are both facing upwards when the left panel is in the opened position;

a top surface of the left panel opposite the bottom of the left panel, the top surface of the left panel including a coupling interface configured to couple the container to a second container;

a support arm, wherein a first end of the support arm is pivotal relative to a top of the left panel that is opposite the bottom of the left panel; and a support structure comprising a ramp that interfaces against a second end of the support arm opposite the first end, wherein when the left panel is in the opened position the ramp defines an angle with respect to a line that extends from the bottom of the ramp to the first axis of the left panel, and wherein the angle is between 95 and 115 degrees.

2. The container of claim 1, the support structure including a protrusion and the support arm defining a recess that receives the protrusion when the second end of the support arm is interfacing against the ramp.

3. The container of claim 1, the support arm comprising pins protruding laterally from the support arm, the pins detachably and rotatably coupling the support arm to the left panel.

4. The container of claim 1 further comprising:

a right panel pivotal relative to the top panel, wherein the right panel pivotally rotates with respect to the top panel around a second axis between an opened position and a closed position, and wherein a bottom of the right panel and the top surface of the top panel are both facing upwards when the right panel is in the opened position.

5. The container of claim 4, wherein the first axis and the second axis are distinct from each other.

6. The container of claim 4, wherein the first axis and the second axis are parallel with respect to each other.

7. The container of claim 6, further comprising:

a second support arm, wherein a first end of the second support arm is pivotal relative to a top of the right panel that is opposite the bottom of the right panel; and a second support structure comprising a second ramp that interfaces against a second end of the second support arm opposite the first end, wherein when the right panel is in the opened position the second ramp defines an angle with respect to a line that extends from the bottom of the second ramp to the second axis of the right panel, and wherein the angle is between 95 and 115 degrees.

8. The container of claim 7, one of the second support structure and the second support arm including a protrusion and the other of the second support structure and the second support arm defining a recess that receives the protrusion when the second end of the second support arm is interfacing against the second ramp.

9. The container of claim 4, wherein the left panel comprises a first lip that extends towards the second axis of the right panel, and wherein the right panel comprises a second lip that extends towards the first axis of the left panel, and wherein when the left panel and the right panel are in the closed position the first lip and the second lip interface with each other to interfere with opening at least one of the left panel and the right panel.

10. The container of claim 4, wherein the left panel defines a first planar bottom surface, and wherein the right panel defines a second planar bottom surface.

11. The container of claim 10, wherein the first planar bottom surface, the second planar bottom surface, and the top surface of the top panel are generally coplanar when the left panel and the right panel are in the opened position.

12. A container comprising:

a housing;

a top panel defining a top surface;

a left panel pivotal relative to the top panel, wherein the left panel pivotally rotates with respect to the top panel around a first axis between an opened position and a closed position, and wherein a bottom of the left panel and the top surface of the top panel are both facing upwards when the left panel is in the opened position, and wherein a top of the left panel defines a channel;

a top surface of the left panel opposite the bottom of the left panel, the top surface of the left panel including a coupling interface configured to couple the container to a second container;

a support arm, wherein a first end of the support arm is pivotally coupled to a top of the left panel that is opposite the bottom, and wherein the support arm rotates with respect to the left panel around a second axis, and wherein the second axis extends through the channel in the left panel; and a biasing element that biases the support arm into the channel.

13. The container of claim 12, comprising:

a support structure comprising a ramp that interfaces against a second end of the support arm opposite the first end when the left panel is in the opened position;

wherein one of the support structure and the support arm including a protrusion and the other of the support structure and the support arm defining a recess that receives the protrusion when the second end of the support arm is interfacing against the ramp.

14. The container of claim 12, the support arm comprising pins protruding laterally from the support arm, the pins detachably and rotatably coupling the support arm to the left panel.

15. The container of claim 14 further comprising:

a right panel pivotal relative to the top panel, wherein the right panel pivotally rotates with respect to the top panel around a second axis between an opened position and a closed position, and wherein a bottom of the right panel and the top surface of the top panel are both facing upwards when the right panel is in the opened position, wherein a top of the right panel defines a second channel;

a second support arm, wherein a first end of the second support arm is pivotal relative to the top of the right panel; and a second biasing element that biases the second support arm into the second channel.

16. The container of claim 15 further comprising:

a second support structure comprising a second ramp that interfaces against a second end of the second support arm opposite the first end, wherein when the right panel is in the opened position the second ramp defines an angle with respect to a line that extends from the bottom of the second ramp to the second axis of the right panel, and wherein the angle is between 95 and 115 degrees.

17. The container of claim 15, wherein the left panel defines a first planar bottom surface and the right panel defines a second planar bottom surface, and wherein the first planar bottom surface, the second planar bottom surface, and the top surface of the top panel are generally coplanar when the left panel and the right panel are in the opened position.

18. A container comprising:

a housing defining an internal storage compartment;

a top panel pivotal relative to the housing, wherein the top panel rotates with respect to the housing around a first axis;

a left panel pivotal relative to the top panel, wherein the left panel pivotally rotates with respect to the top panel around a second axis between an opened position and a closed position, and wherein the second axis is perpendicular to the first axis, the left panel including a first planar bottom surface that faces downward when the left panel is in the closed position relative to the top panel and that faces upward when the left panel is in the opened position relative to the top panel;

a right panel pivotal relative to the top panel, wherein the right panel pivotally rotates with respect to the top panel around a third axis between an opened position and a closed position, and wherein the third axis is perpendicular to the first axis, and wherein the second axis and the third axis are parallel with respect to each other, the right panel including a second planar bottom surface that faces downward when the right panel is in the closed position relative to the top panel and that faces upward when the right panel is in the opened position relative to the top panel; and a bottom surface of the container that defines a coupling interface configured to couple the container to a second container.

19. The container of claim 18, wherein the first planar bottom surface and the second planar bottom surface are generally coplanar when the left panel and the right panel are in the opened position.

20. The container of claim 18, wherein the second axis and the third axis are parallel to each other, and wherein the first axis is perpendicular to each of the second axis and the third axis.

* * * * *